(12) United States Patent
Ohmi et al.

(10) Patent No.: US 7,798,167 B2
(45) Date of Patent: Sep. 21, 2010

(54) INTERNAL PRESSURE CONTROLLER OF CHAMBER AND INTERNAL PRESSURE SUBJECT-TO-CONTROL TYPE CHAMBER

(75) Inventors: Tadahiro Ohmi, 1-17-301, Komegahukuro 2-chome, Aoba-ku, Sendai-shi, Miyagi 9800813 (JP); Akniobu Teramoto, Sendai (JP); Tomio Uno, Osaka (JP); Ryousuke Dohi, Osaka (JP); Kouji Nishino, Osaka (JP); Osamu Nakamura, Osaka (JP); Atsushi Matsumoto, Osaka (JP); Masaaki Nagase, Osaka (JP); Nobukazu Ikeda, Osaka (JP)

(73) Assignees: Fujikin Incorporated, Osaka-shi, Osaka (JP); Tadahiro Ohmi, Sendai-shi (JP)

( * ) Notice: Subject to any disclaimer, the term of this patent is extended or adjusted under 35 U.S.C. 154(b) by 670 days.

(21) Appl. No.: 11/278,909

(22) Filed: Apr. 6, 2006

(65) Prior Publication Data

US 2006/0207595 A1 Sep. 21, 2006

Related U.S. Application Data

(63) Continuation-in-part of application No. PCT/JP2004/013368, filed on Sep. 14, 2004.

(30) Foreign Application Priority Data

Oct. 6, 2003 (JP) .............................. 2003-346497

(51) Int. Cl.
G05D 7/06 (2006.01)

(52) U.S. Cl. ............................ 137/487.5; 137/601.01; 137/601.14

(58) Field of Classification Search .............. 137/487.5, 137/599.04, 599.05, 599.07, 601.14, 601.01
See application file for complete search history.

(56) References Cited

U.S. PATENT DOCUMENTS 5,158,108 A * 10/1992 Semaan et al. ........... 137/487.5

(Continued)

FOREIGN PATENT DOCUMENTS

JP 8-334546 A 12/1996

(Continued)

OTHER PUBLICATIONS

International Search Report issued in the corresponding PCT/JP2004/013368, completed Dec. 20, 2004 and mailed Jan. 11, 2005.

*Primary Examiner*—Stephen Hepperle
*Assistant Examiner*—William McCalister
(74) *Attorney, Agent, or Firm*—Griffin & Szipl, P.C.

(57) ABSTRACT

A gas supply facility includes a plurality of pressure type flow controllers connected in parallel, and a first controller to control operation of the plurality of pressure type flow controllers so as to supply a desired gas exhausted by a vacuum pump to a chamber while controlling its flow rate, one of the pressure type flow controllers operates as a second controller to control the gas flow rate range up to 10% of the maximum flow rate supplied to the chamber, while the remaining pressure type flow controllers are made to be ones that control the rest of the gas flow rate range. Furthermore, pressure inside the chamber is controlled by installing a pressure detector in the chamber, inputting the value detected by the detector to the controller, and by adjusting a control signal to the pressure type flow controllers.

8 Claims, 9 Drawing Sheets

U.S. PATENT DOCUMENTS

| | | | | |
|---|---|---|---|---|
| 5,433,238 | A * | 7/1995 | Cannizzaro et al. | 137/14 |
| 5,744,695 | A * | 4/1998 | Forbes | 73/1.35 |
| 5,875,817 | A | 3/1999 | Carter | |
| 6,178,995 | B1 | 1/2001 | Ohmi et al. | |
| 6,422,264 | B2 | 7/2002 | Ohmi et al. | |
| 6,752,166 | B2 * | 6/2004 | Lull et al. | 137/9 |
| 6,916,397 | B2 * | 7/2005 | Pfeiffer et al. | 156/345.26 |
| 6,964,279 | B2 * | 11/2005 | Ohmi et al. | 137/487.5 |
| 2002/0179148 | A1 | 12/2002 | Lull et al. | |
| 2007/0193628 | A1 * | 8/2007 | Kannan et al. | 137/487.5 |

FOREIGN PATENT DOCUMENTS

| | | |
|---|---|---|
| JP | 08-335846 A | 12/1996 |
| JP | 8-338546 A | 12/1996 |
| JP | 08-338564 A | 12/1996 |
| JP | 11-212653 A | 8/1999 |
| JP | 2000-137528 A | 5/2000 |
| JP | 2000-240586 A | 9/2000 |
| JP | 2001-175336 A | 6/2001 |
| JP | 2002-116824 A | 4/2002 |
| JP | 2003-195948 A | 7/2003 |
| WO | 0196972 A1 | 12/2001 |
| WO | 2005-013026 A1 | 2/2005 |

* cited by examiner

PRIOR ART

FIG. 9

PRIOR ART

FIG. 10

PRIOR ART

US 7,798,167 B2

INTERNAL PRESSURE CONTROLLER OF CHAMBER AND INTERNAL PRESSURE SUBJECT-TO-CONTROL TYPE CHAMBER

This is a Continuation-in part Application in the United States of International Patent Application No. PCT/JP2004/013368 filed Sep. 14, 2004, which claims priority on Japanese Patent Application No. 2003-346497, filed Oct. 6, 2003. The entire disclosures of the above patent applications are hereby incorporated by reference.

FIELD OF THE INVENTION

The present invention is concerned with an internal pressure controller of a chamber and an internal pressure subject-to-control type chamber utilized with semiconductor manufacturing facilities and the like.

BACKGROUND OF THE INVENTION

In recent years, gas supply facilities equipped with a so-called "pressure type flow controller" to be employed for a gas supply facility to a process chamber have been widely used with semiconductor manufacturing facilities and the like.

Figure 8:
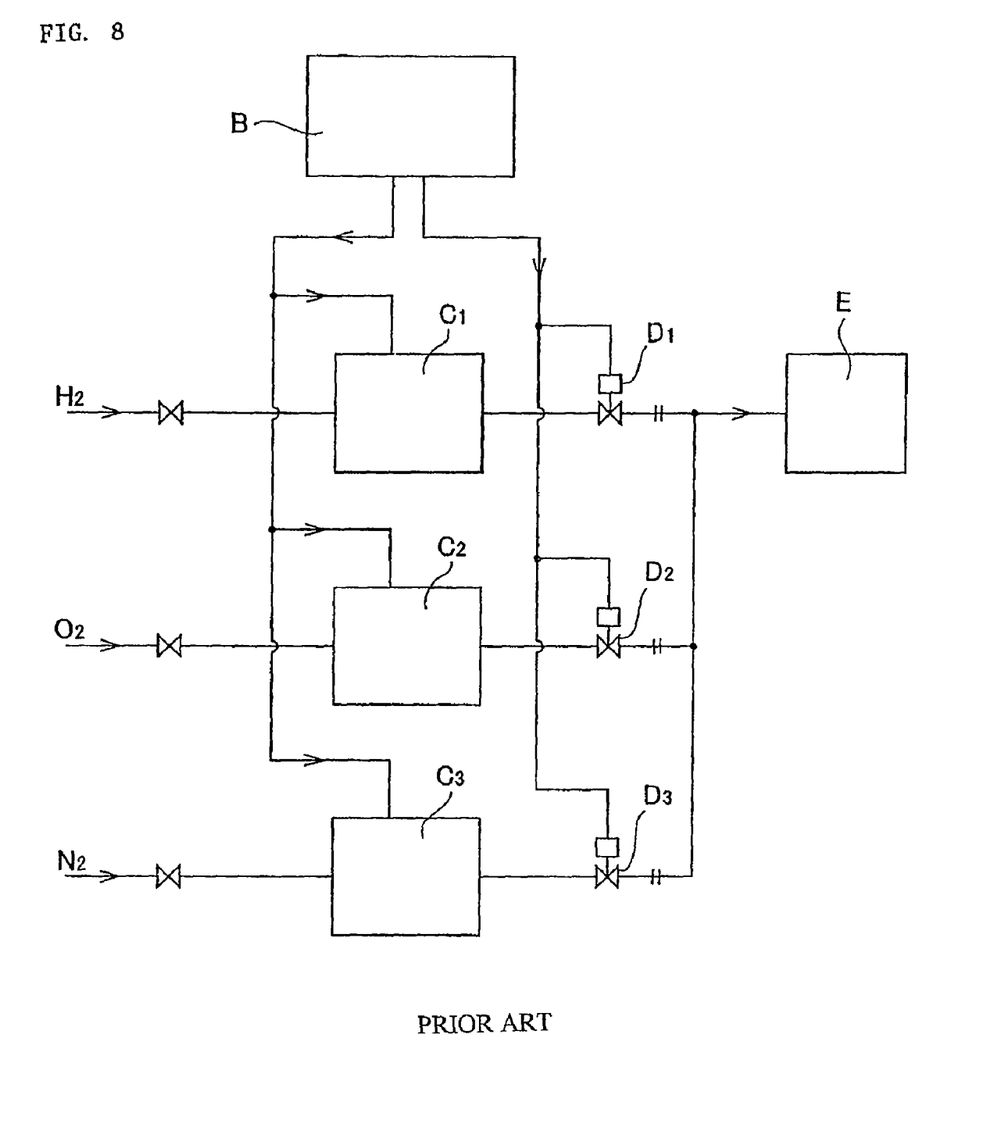
FIG. 8 is an explanatory drawing of a fluid supply facility connected to a chamber, which employs a conventional pressure type flow controller.
Figure 9:
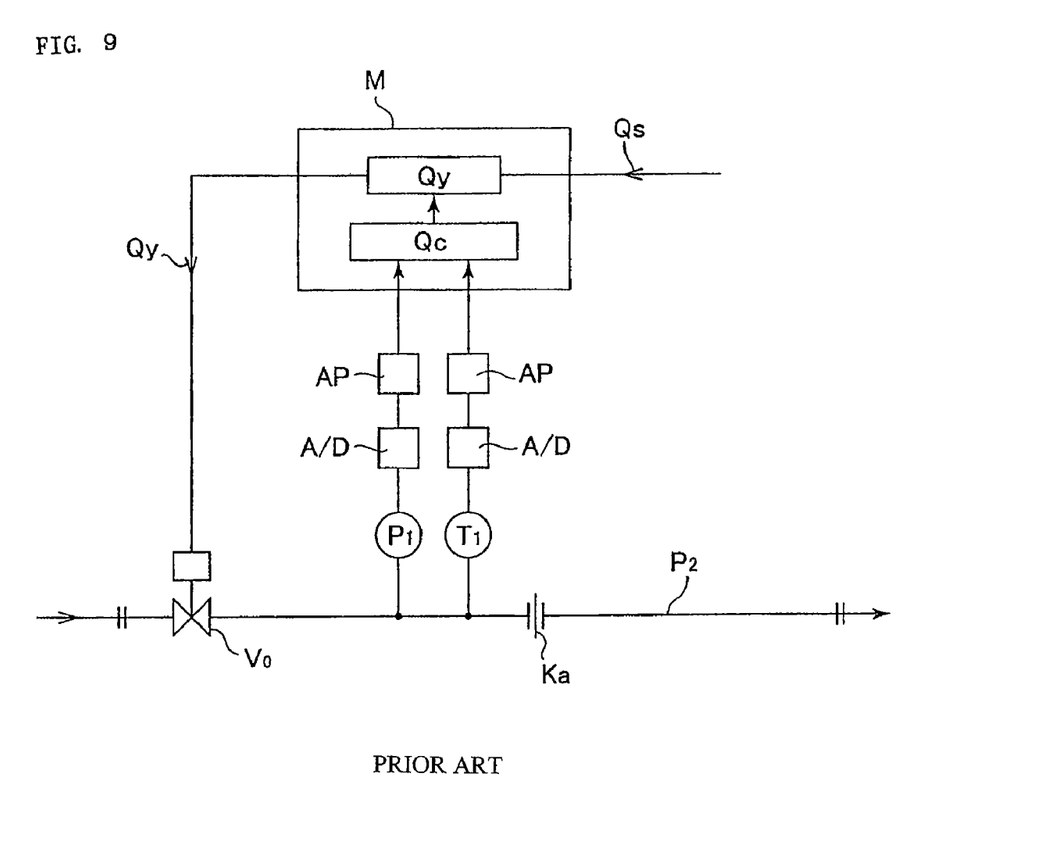
FIG. 9 is a block diagram of a pressure type flow controller.

FIG. 8 illustrates one example. It is so constituted that pressure type flow controllers $C_1$, $C_2$ and $C_3$ and fluid switching valves $D_1$, $D_2$ and $D_3$ are provided, and switching of the fluid supplied to the process chamber E, and flow rate adjustments, are automatically performed with signals from a controller B (TOKU-KAI-HEI No. 11-212653 and others). Also, it is so constituted that, with the afore-mentioned pressure type flow controllers $C_1$, $C_2$ and $C_3$, a flow rate passing through an orifice is computed by a computation device M, using the formula $Qc=KP_1$, by maintaining the fluid passing through an orifice Ka under critical conditions (i.e., $P_1/P_2$ larger than approximately 2) as illustrated in FIG. 9. The computed flow rate is used to control opening or closing of a control valve $V_0$ (to adjust pressure $P_1$ on the upstream side of an orifice) so that a difference Qy with a set flow rate Qs is made to be zero. Here, A/D designates a signal converter and AP designates an amplifier (TOKU-KAI-HEI No. 8-338546).

Figure 10:
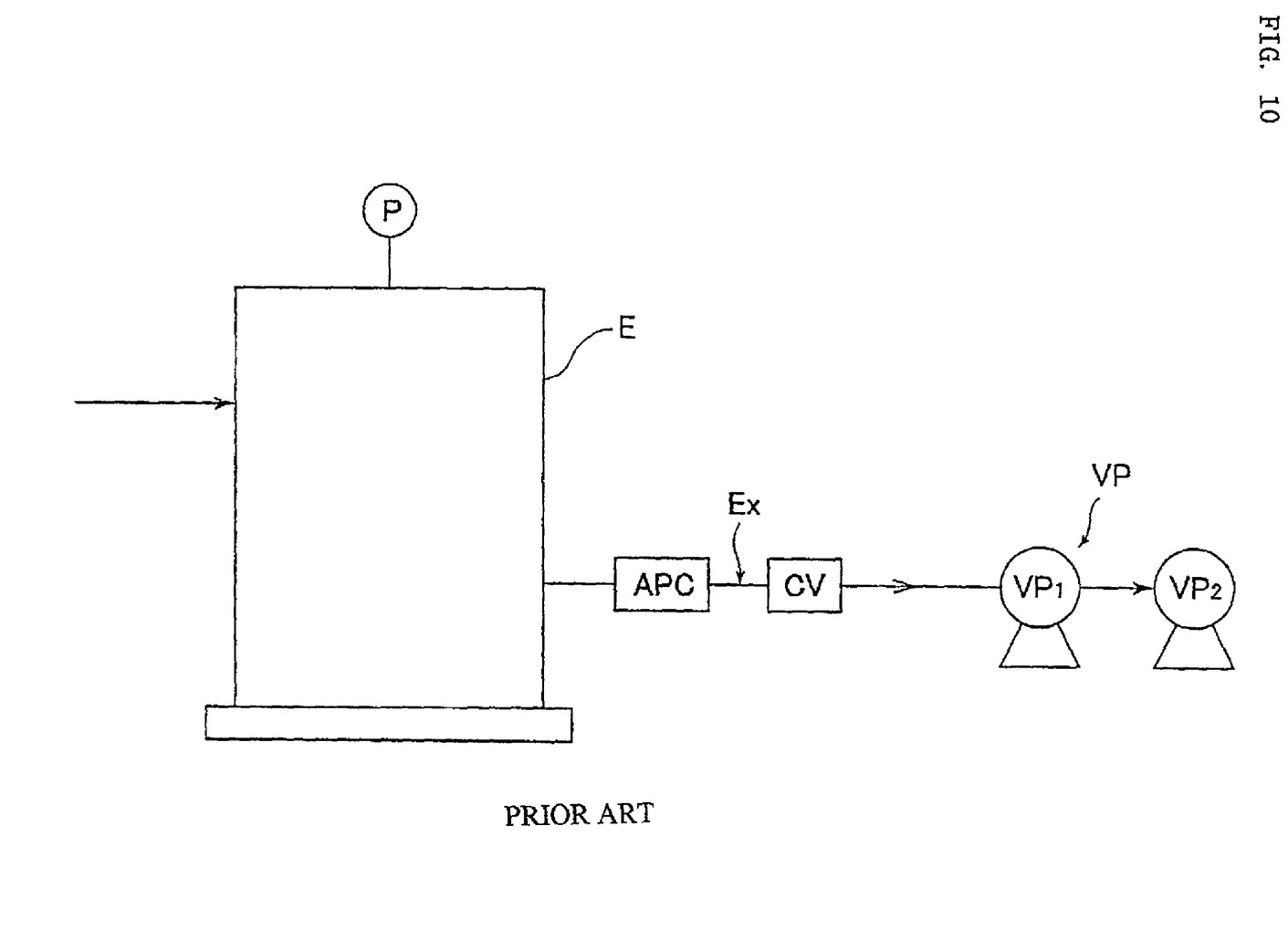
FIG. 10 is an explanatory drawing showing an evacuation system of a conventional process chamber.

As illustrated in FIG. 10, the internal pressure of the afore-mentioned process chamber E is maintained at a set value ($10^{-6}$~$10^2$ Torr) by continuously operating a vacuum pump VP through an evacuation line Ex having a comparatively large bore equipped with an automatic pressure controller APC and a conductance valve CV.

A combination of a primary vacuum pump (a high vacuum pump) $VP_1$, such as a turbo molecular pump and the like, and a secondary vacuum pump (a low vacuum pump) $VP_2$, such as a scroll pump and the like, is commonly used for the afore-mentioned vacuum pump VP. However, this exhaust system, for which one vacuum pump having a large exhaust volume and large compression ratio is used, has disadvantageously high manufacturing costs and the like, so it is not popular. An internal pressure of chamber E is maintained solely by the operation control on the exhaust system side. Specifically, a set internal pressure is maintained by adjusting the degree of opening of the automatic pressure controller APC and conductance valve CV.

However, with a process chamber E, as shown in FIG. 10, continuous operation of the primary vacuum pump $VP_1$ and the like, such as a turbo molecular pump having a high compression ratio and a large exhaust volume, is required. Furthermore, to reduce loads on the primary vacuum pump $VP_1$ and the secondary vacuum pump $VP_2$, it becomes necessary that the diameter of the pipe for the evacuation system Ex needs to be relatively large. In addition, a conductance valve CV, an automatic pressure controller APC, and the like, are required. Accordingly, equipment costs and operating costs of running the vacuum chamber E are high, so it is difficult to achieve reduction of costs with this system.

With a process chamber E, as shown in FIG. 10, internal pressure of the chamber is controlled using only the operation control of the automatic pressure controller APC and the like. This results in problems such as a low operating rate of the process chamber, which leads to unevenness in quality of treated products because too much time is needed for adjusting the internal pressure of the chamber due to so-called "poor pressure control responsivity."

On the other hand, to raise responsivity of internal pressure of the chamber E, measures to control the flow rate of gas supplied into the chamber E might be taken in addition to the control of the exhaust side. However, it is necessary to substantially improve accuracy of the flow rate of gas supplied into chamber E so, over a wide range of pressures, the internal pressure of chamber E may be adjusted by adjusting the flow rate of gas into the chamber E.

A fluid supply facility connected to chamber E, as shown in FIG. 8, has the feature that pressure type flow controllers $C_1$, $C_2$, $C_3$ used in the facility are not influenced by internal pressure changes on the side of chamber E. Therefore, a comparatively stable control of the flow rate of the supply gas is ensured as long as critical conditions are maintained, thus achieving an excellent, practical effect.

However, various difficulties with this type of fluid supply facility have been found. Among those difficulties, there is a particular need to raise accuracy of flow rate control in the small flow quantity range (i.e., small gas flow rates). For example, assuming that the accuracy of flow rate control of a pressure type flow controller, which has a rated flow rate of 1 SLM ("Standard liter/min:" a flow rate of a gas converted to a standard state), is 1% F.S. ("Full Scale") less than a setting 10%. In this case, there is a possible maximum error of 1 SCCM ("Standard Converted cm$^3$/min") when the value of the control flow rate is set at 1% of the rated flow rate. Accordingly, when the control flow rate becomes less than 10% of the rated flow rate (for example, less than 10-100 SCCM), The effect of the error of the afore-mentioned 1 SCCM is no longer negligible and cannot be ignored. As a result, accurate flow rate control cannot be expected in the small flow quantity range, which is less than 100 SCCM.

| Patent Literature | TOKU-KAI-HEI No. 11-212653 | Public Bulletin |
|---|---|---|
| Patent Literature | TOKU-KAI-HEI No. 8-338546 | Public Bulletin |

OBJECT OF THE INVENTION

The present invention aims to solve the afore-mentioned problems with internal pressure control of a vacuum chamber equipped with a conventional pressure type flow controller, namely, to solve the problems of (1) the low responsivity of internal pressure control of a chamber, (2) the difficulty in accurately adjusting internal pressure of the chamber by controlling flow rate of a supply gas to the chamber because, when employing a pressure type flow controller of a gas supply facility, the range of flow rate control is limited to a range of approximately 1~100% and accuracy of flow rate control over the flow rate range of less than 1% declines, (3) the difficulty in downsizing the facility of an evacuation system of a vacuum chamber and reducing facility and operation costs, and the like. Thus, it is a primary object of the present invention to provide an internal pressure controller of a chamber wherewith internal pressure of a vacuum chamber can be controlled with high accuracy and high responsivity over a wide pressure range by employing a fluid supply facility that allows an accurate flow control over the wide range of 0.1%~100% of the required maximum set flow rate relevant to internal pressure changes of the vacuum chamber. It is also a primary object of the present invention to provide an internal pressure subject-to-control type chamber that allows accurate internal pressure control by employing the internal pressure controller of the chamber.

SUMMARY OF THE INVENTION

The present invention in accordance with a first embodiment is an internal pressure controller of a chamber that includes: a supply gas input part, a supply gas output part, a gas flow rate control part arranged between the gas input part and the gas output part, and a means to transmit the data on the pressure of a chamber, wherein the supply gas is outputted to the gas flow rate control part, and the gas flow rate control part is equipped with a plurality of pressure type flow rate controllers connected in parallel, and a first controller to control the operation of the plurality of pressure type flow controllers, wherein each pressure type flow controller comprises an orifice, a pressure detector on the upstream side of the orifice, a control valve provided on the upstream side of the pressure detector, and a computation control part that outputs the difference Qy with the set flow rate Qs to a control valve as a driving signal by computing the gas flow rate Qc passing through the orifice with pressure $P_1$ detected by the pressure detector and a formula $Qc=KP_1$, where K is a constant, thus making each pressure type flow controller operate under a state wherein pressure $P_1$ is maintained more than approximately 2 times of pressure $P_2$ on the downstream side of the orifice, and at the same time, making one of the plurality of pressure type flow controllers operate as a second controller to control the gas flow rate range up to 10% of the maximum flow rate supplied to the chamber, while the remaining pressure type flow controllers operate as third controllers to control the rest of the gas flow rate ranges, and the data on pressure are inputted to the second controller to adjust a control signal to the one pressure type flow controller so as to control the gas flow rate to the gas output part.

The present invention, in accordance with a second embodiment, modifies the first embodiment so that the second controller is equipped with an input setting part to set a gas flow rate supplied to the chamber, a first signal conversion part to convert an input value to the input setting part into a flow rate control signal, a second signal conversion part to convert pressure detected inside the chamber to a flow rate control signal, and a comparison correction part for comparing flow rate control signals from both signal conversion parts so as to control the supply volume of gas into the chamber by transmitting corrected control signals to each of the pressure type flow controllers from the comparison correction part.

The present invention, in accordance with a third embodiment, modifies the first embodiment and the second embodiment to include 2 pressure type flow controllers connected in parallel, and one is used for controlling a small flow quantity range, while the other one is used for controlling a large flow quantity range. The present invention in accordance with a fourth embodiment, modifies the first embodiment, so that the flow rate control range of a pressure type flow controller for a small flow quantity range is made to be 0.1 to 10% of a maximum flow rate supplied to the chamber, while the flow rate control range of a pressure type flow controller for a large flow quantity is made to be 10 to 100% of a maximum flow rate supplied to the chamber.

The present invention, in accordance with a fifth embodiment, further modifies the first embodiment and the third embodiment so that the plurality of pressure type flow controllers are made to operate in turn, starting with the pressure type flow controller for the smaller flow quantity range, by means of control signals transmitted from one or both signal conversion parts of the first controller.

The present invention, in accordance with a sixth embodiment, modifies the first embodiment so that an exhaust velocity of the evacuation system is made to vary by gas flowed into the evacuation system.

The present invention, in accordance with a seventh embodiment, modifies the first embodiment so that a plurality of gases are supplied to the chamber by installing the plurality of pressure type flow controllers connected in parallel, wherein the plurality of pressure type flow controllers includes at least 4 units.

The present invention, in accordance with an eighth embodiment, further modifies the second embodiment so that a fourth flow rate controller is provided for a rising rate setting mechanism of control signals to be transmitted to pressure type flow controllers allotted for all of the flow rate range, and the pressure type flow controllers supply the set flow rate of gas after a specified lapse of time following transmission of control signals.

The present invention in accordance with a ninth embodiment includes a chamber exhausted by a vacuum pump and a gas supply means, wherein a desired gas is supplied while the flow rate of the gas is controlled, and the gas supply means is equipped with a plurality of pressure type flow controllers connected in parallel and a first controller to control the operation of the plurality of pressure type flow controller, wherein the first controller comprises an orifice, a first pressure detector on the upstream side of the orifice, a control valve provided on the upstream side of the first pressure detector, and a computation control part that outputs the difference Qy with the set flow rate Qs to a control valve as a driving signal by computing the gas flow rate Qc passing through the orifice with pressure $P_1$ detected by the first pressure detector and by using formula $Qc=KP_1$, where K is a constant, thus making each pressure type flow controller operate under a state wherein pressure $P_1$ is maintained more than approximately 2 times of pressure $P_2$ on the downstream side of the orifice, and at the same time, making one of the plurality of pressure type flow controllers operate as a second controller to control the gas flow rate range up to 10% of the maximum flow rate supplied to the chamber, while the remaining pressure type flow controllers operate to control the rest of the flow rate ranges, and furthermore, the chamber is provided with a second pressure detector and the detected value of the second pressure detector is inputted to the first controller to adjust a control signal transmitted to a third pressure type flow controller and to control the supply rate of gas to the chamber, thus an internal pressure of the chamber is controlled with high accuracy over a wide range of pressures.

EFFECTS OF THE INVENTION

Using an internal pressure controller of the chamber, accurate flow rate control can be achieved over a wide flow rate range because the internal pressure controller serves to divide a required flow rate range into a plurality of smaller flow rate ranges, thus allowing a small flow quantity, i.e., less than 10% of a maximum flow rate, to be controlled by a pressure type flow controller for controlling a small flow quantity.

Also, because of superimposition of flow rate control by means of pressure type flow controllers allotted for all of the flow rate ranges, the flow rate of gas supplied to the chamber can be controlled continuously due to the feature of superimposed flow rate control wherein the rate of rise of a control signal has imposed limitations.

As a result, the flow rate of gas supplied to the chamber can be adjusted accurately and quickly, thus allowing an internal pressure of the chamber to be easily adjusted and maintained at a specified set pressure. Thus, the need for a conventional automatic pressure controller APC can be eliminated, and facility costs for constructing an evacuation system for the chamber can be substantially reduced. Also, the vacuum pump utilized, in accordance with the present invention, is one having an exhaust volume large enough to reach the lowest specified pressure of the chamber. This means that unlike a conventional evacuation system of a chamber, it is not necessary that the vacuum pump, in accordance with the present invention, to have a considerable excess margin for evacuation volume. Accordingly, a considerable cost reduction of the evacuation system becomes possible as well.

BRIEF DESCRIPTION OF THE DRAWINGS

FIG. 4 (*a*) denotes the case when flow rates of 2 pressure type flow controllers are made to change from 0% to 100% in 60 seconds. FIG. 4 (*b*) denotes the case when flow rates are made to change from 0% to 100% in 30 seconds. FIG. 4 (*c*) denotes the case when flow rates are made to change from 0% to 100% in step-like fashion.

| List of Reference Characters and Numerals | |
|---|---|
| A | Gas supply facility |
| Gs | Supply gas |
| FCS(A) | Pressure type flow controller for a small flow quantity |
| FCS(B) | Pressure type flow controller for a large flow quantity |
| $Q_1$ | Control flow rate of pressure type flow controller for a small flow quantity |
| $Q_2$ | Control flow rate of pressure type flow controller for a large flow quantity |
| Q | Supply flow rate to a chamber |
| P | Pressure inside a chamber |
| E | Process chamber |
| V | Adjustment valve |
| VP | Vacuum pump |
| $V_1$~$V_3$ | Control valves |
| $L_1$ | Gas supply pipe |
| $L_2$~$L_3$ | Exhaust pipes |
| 1 | Controller |
| 1a | Flow rate input setting part (flow rate % setting mechanism) |
| 1a' and 1b'' | Control signal rising rate setting mechanism |
| 1b and 1c | Signal conversion parts |
| 1d | Comparison correction part |
| 1p | Pressure detection signal |
| 1e, 1e' and 1f, 1f' | Control signals |
| 1h | Switching operation part |
| 2 | Pressure detector |
| 3 | Manometer |
| 4 | Pressure type flow controller |
| 5 | Switching valve |

ILLUSTRATIVE EMBODIMENTS AND BEST MODE TO CARRY OUT THE INVENTION

The following embodiments of the present invention are described as follows with reference to the drawings, where like references refer to like parts.

The First Embodiment

Figure 1:
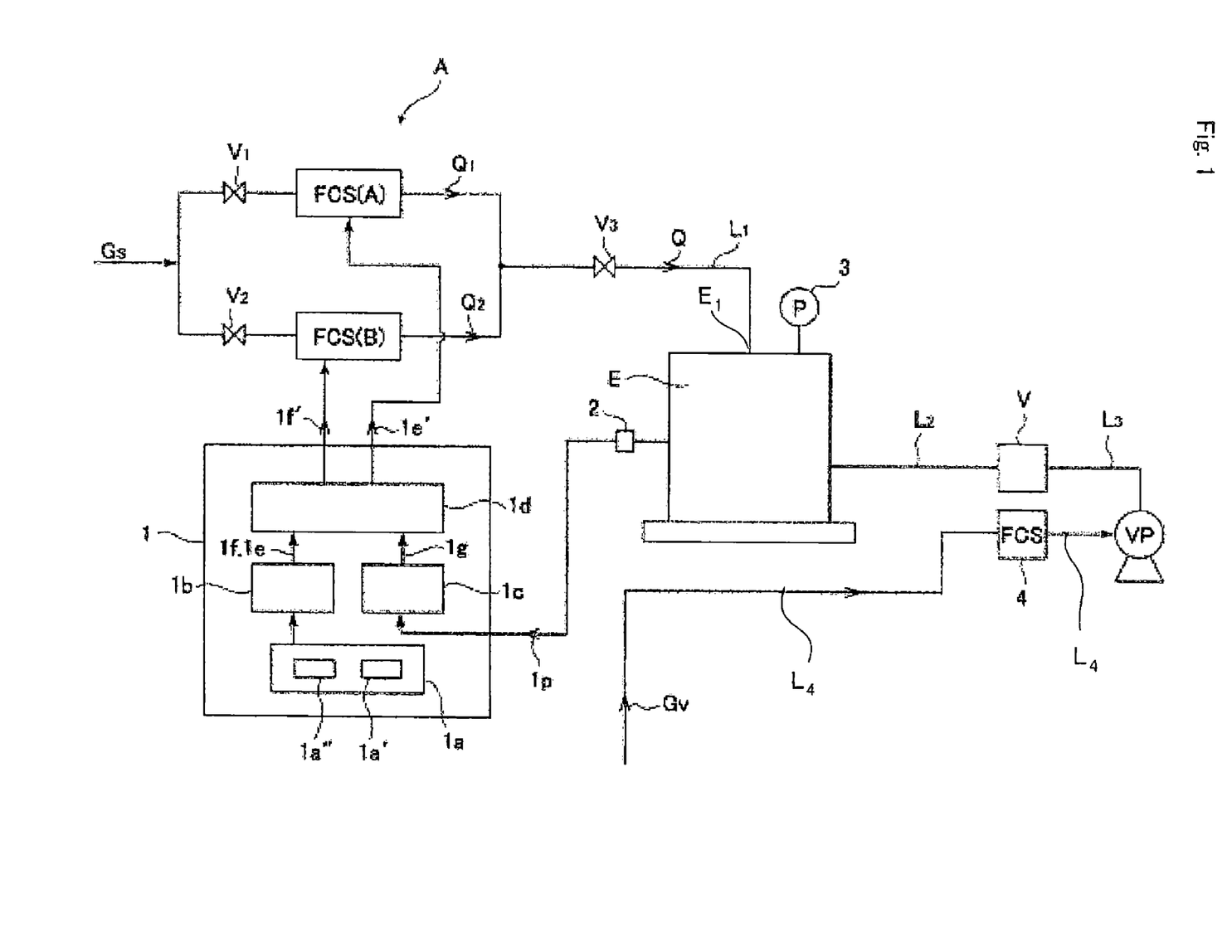
FIG. 1 is a whole system diagram illustrating a first embodiment of an internal pressure controller of a chamber according to the present invention.

FIG. 1 illustrates the first non-limiting embodiment of an internal pressure controller of a chamber, according to the present invention, which shows basic structure of the internal pressure controller. As shown in FIG. 1, A designates a gas supply facility, Gs designates a supply gas from a supply gas input part 10, FCS(A) designates a pressure type flow controller for a small flow quantity, FCS(B) designates a pressure type flow controller for a large flow quantity, E designates a process chamber, $E_1$ designates a single inlet of the process chamber (E), P designates pressure inside chamber E, $Q_1$ designates a control flow rate of the pressure type flow controller FCS(A) for a small flow quantity, $Q_2$ designates a control flow rate of the pressure type flow controller FCS(B) for a large flow quantity, Q designates a supply flow rate to chamber E, V designates an adjustment valve, VP designates a vacuum pump, $V_1$-$V_3$ designate control valves, $L_1$ designates a gas supply pipe, $L_2$-$L_3$ designates exhaust pipes, $L_4$ designates an additional gas supply pipe, 1 designates a controller, 1*a* designates a flow rate input setting part (a flow rate % setting mechanism), 1*b* designates a No. 1 (first) signal conversion part, 1*c* designates a No. 2 (second) signal conversion part, 1*d* designates a comparison correction part, 1*e*, 1*e*' and 1*f*, 1*f*' designate control signals, 2 designates a pressure detector, 3 designates a manometer, and 4 designates a pressure type flow controller.

In particular, a supply gas Gs from the afore-mentioned supply gas input part is supplied to the chamber E through the supply gas output part consisting of gas supply pipe $L_1$ and the like while the flow rate is controlled by the flow rate control part consisting of the gas supply facility A and the controller 1. And, a gas supply means for supplying gas to the chamber E is made up of the afore-mentioned supply gas input part, the gas flow rate control part, the supply gas output, and the like.

The afore-mentioned pressure type flow controllers FCS (A) and FCS(B) are basically identical to a conventional pressure type flow controller shown in FIG. 9. Each pressure type flow controller is fundamentally constructed so that a gas flow rate passing through an orifice of each pressure type flow controller is computed with the formula $Qc=KP_1$ (where K is a constant) by satisfying the condition that $P_1/P_2$ is approximately more than 2, or by satisfying critical conditions of fluid (gas) between pressure $P_1$ on the upstream side of an orifice Ka and pressure $P_2$ on the downstream side of the orifice Ka. Using the difference Qy between the computed value Qc and the set value (i.e., set flow rate Qs), a control valve Vo, provided on the upstream side of orifice Ka, is controlled for automatic opening and closing to adjust pressure $P_1$. In this way, a flow rate actually passing through orifice Ka is controlled to the afore-mentioned set value (i.e., set flow rate Qs).

The above embodiment of the present invention is constructed so that flow rate control can be achieved continuously and accurately over the entire flow rate range ranging from a minimum flow of 5 SCCM to a maximum flow of 3100 SCCM by employing different pressure type flow controllers, such as by employing one pressure type flow controller FCS (A) with a rated flow rate of 100 SCCM as the pressure type flow controller for a small flow quantity, and by employing another pressure type flow controller FCS(B) with a rated flow rate of 3000 SCCM as the pressure type flow controller for a large flow quantity. The structural details of the afore-mentioned pressure type flow controllers FCS(A) and FCS (B) are well-known to those skilled in the art. Therefore, detailed explanations regarding pressure type flow controllers FCS(A) and FCS(B) are omitted.

The inside capacity of the afore-mentioned process chamber E is set at 1l liters, and the chamber E is continuously evacuated through evacuation lines, $L_2$ and $L_3$, equipped with an adjustment valve V by means of a vacuum pump VP having an exhaust capacity of 300 liters/min so that the inside of the chamber E is maintained in vacuum of $10^{-2} \sim 10^2$ Torr.

The pressure type flow controller 4 is employed for adjusting a flow rate of a gas Gv supplied to a vacuum pump VP (or to an exhaust pipe L3) through the additional gas supply pipe ($L_4$), and controls the internal pressure of the chamber E by reducing an exhaust capability of the vacuum pump VP using the supply of the gas Gv. By supplying gas Gv to vacuum pump VP through the additional gas supply pipe ($L_4$), affects on the pressure inside chamber E can be reduced and the responsivity to internal pressure adjustment can be also be improved. The gas Gv could be same type of gas as supply gas Gs or it could be a different type of gas (e.g., an inactive gas).

A stainless steel pipe with an external diameter of 6.35 mm$\phi$ and an internal diameter of 4.35 mm$\phi$, a stainless steel pipe with an external diameter of 60.5 mm$\phi$ and an internal diameter of 54.9 mm$\phi$, and a stainless steel pipe with an external diameter of 28 mm$\phi$ and an internal diameter of 24 mm$\phi$, respectively, are used for the afore-mentioned gas supply pipe $L_1$, exhaust pipe $L_2$ and exhaust pipe $L_3$.

The afore-mentioned controller 1 comprises an input setting part 1a (a flow rate % setting mechanism), No. 1 and No. 2 signal conversion parts 1b and 1c, and a comparison correction part 1d. A desired flow rate (%) to the rated maximum flow rate is set by the input setting part 1a (i.e., a flow rate setting mechanism). Also, the relationship between pressure P inside chamber E and a flow rate Q of gas flowed into the chamber E, in the event that the vacuum pump VP is continuously and normally operated under specified conditions, is known beforehand as explained later. Accordingly, for controlling pressure P inside chamber E, first, a gas supply quantity Q required for a set pressure P inside chamber E is determined with reference to table values previously obtained, and then a flow rate % setting value, corresponding to the gas supply quantity Q required, is inputted to the input setting part 1a.

Specifically, the input setting part 1a is equipped with a flow rate % setting mechanism, which is made so that a required flow rate Q, corresponding to a set pressure P, is expressed by the flow rate (%) to the total maximum flow rate of both pressure type flow controllers FCS(A) and FCS(B). The input setting part 1a is also equipped with rising rate setting mechanisms 1a' and 1a'' for initiating control signals 1e and 1f for both pressure type flow controllers FCS(A) and FCS(B). A flow rate Qs of a process gas Gs required to control a pressure P inside the process chamber E to a set value of pressure is set by a flow rate % setting mechanism of the input setting part 1a.

To operate both pressure type flow controllers FCS(A) and FCS(B) by setting a flow rate at any given rate within the range from the minimum flow rate of 0% to the maximum flow rate of 100%, the control signal rising rate setting mechanisms 1a' and 1a'' of the input setting part 1a function to adjust the rising rates of control signals 1e (1e') and 1f (1f') applied to pressure type flow controller FCS(A) and FCS(B) for both small and large flow quantities, respectively. For example, in the event that a gas Gs is supplied at a set flow rate of 50 SCCM (an input set value of 1.613%) and then is increased to a flow rate of 2000 SCCM (an input set value of 64.516%), the operation of the pressure type flow controller FCS(A) for a small flow quantity is joined by operation of the pressure type flow controller FCS(B) for large flow quantity. In other words, at low flow quantity (e.g., 50 SCCM) only the pressure type flow controller FCS(A) is in operation. However, at high flow quantity (e.g., 2000 SCCM) gas supply facility A switches to the operation of both pressure type flow controllers FCS(A) and FCS(B). Due to this switch in the operation of the pressure type flow controllers FCS(A) and FCS(B), it becomes necessary to make some lag time adjustments (approximately 30 seconds in flow rate changes of 0→100%) for the pressure type flow controller FCS(B) for a large quantity to reach 1900 SCCM from a flow rate of 0. Thus, the rising rate of control input signal 1f to FCS(B) needs to be adjusted when the pressure type flow controller FCS(B) switches into operation at higher flow quantities.

The No. 1 signal conversion part 1b is for outputting control signals 1e and 1f corresponding to a flow rate % setting input compatible with a set pressure P. The No. 1 signal conversion part 1b outputs control signals 1e and 1f to both pressure type flow controllers FCS(A) and FCS(B). In a particular embodiment, a control signal of the pressure type flow controller FCS(A), which has a maximum flow rate of 100 SCCM, and a control signal of the pressure type flow controller FCS(B), which has a maximum flow rate of 3000 SCCM, are set to a value of 1V (0 SCCM)-5V (100 SCCM) and to a value of 0V (0 SCCM)-5V (3000 SCCM), respectively. And, both pressure type flow controllers FCS(A) and FCS(B) receive control signals 1e and 1f, respectively, which correspond with control flow rates $Q_1$ and $Q_2$, after control signals 1e and 1f are inputted from the No. 1 signal conversion part 1b to a comparison part 1d as shown in FIG. 1.

The No. 2 signal conversion part 1c is for converting a detection signal 1p from the pressure detector 2, which has detected a pressure P inside the chamber E, to a flow rate control signal 1g. The converted flow rate signal 1g is then inputted to the comparison correction part 1d.

Furthermore, using the comparison correction part 1d, set flow rate control signals 1e and 1f outputted from the No. 1 signal conversion part 1b are contrasted or compared with the flow rate signal 1g determined, using a value of pressure detected (i.e., pressure detection signal 1p), using the No. 2 signal conversion part 1c. When the flow rate control signal 1g, computed using the pressure detection signal 1p from a pressure detector 2, is larger than the set flow rate control signals 1e and 1f (that is, pressure P inside the chamber E is on the plus side of the set pressure which makes the degree of vacuum in the chamber low due to the large supply flow rate Q of gas), the control signals 1e and 1f are corrected toward the direction of signal reduction, thus the supply flow rate Q is adjusted toward the direction of reduction of flow. Conversely, when the flow rate control signal 1g is computed, using the pressure detection signal 1p, is smaller than the set flow rate control signals 1e and 1f (that is, pressure P inside chamber E is on the minus side of the set pressure which makes the degree of vacuum in the chamber high due to an insufficient supply flow rate Q of gas), control signals 1e and 1f are corrected toward the direction of signal increase, thus the supply flow rate Q is adjusted toward the direction of increasing flow.

In accordance with the present invention, as shown in FIG. 1, the pressure detection signal 1p, corresponding to the pressure inside chamber E as detected with the pressure detector 2, is used as a feedback signal to correct flow rate control signals 1e and 1f that are outputted to pressure type flow controllers FCS(A) and FCS(B). In this manner, corrected control signals 1e' and 1f' are inputted to the pressure type flow controllers FCS(A) and FCS(B), thus allowing pressure P inside chamber E to be constantly and accurately maintained at the set value and while manifesting high responsivity as well.

Figure 2:
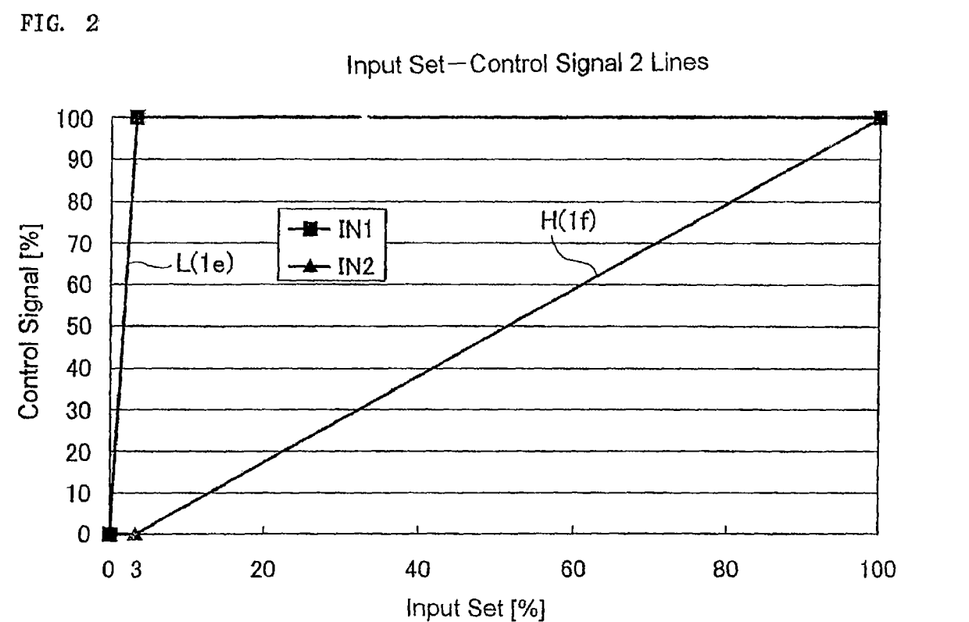
FIG. 2 is a diagram showing the relationship between input setting (%) and control signal (%) for an internal pressure controller of a chamber made in accordance with the embodiment of FIG. 1.

FIG. 2 is a diagram showing the relationship between a flow rate input setting (%), and control signals 1e and 1f provided by and measured at the input setting part 1a of the controller 1. As shown in FIG. 1, control signals 1e and 1f that have originated from the flow rate inputting setting part 1a are then transmitted by the No. 1 signal conversion part 1b. In FIG. 2, curve L and curve H illustrate control signal 1e of the pressure type flow controller FCS(A) for small flow quantity (100 SCCM) and control signal 1f of the pressure type flow controller FCS(B) for large flow quantity (3000 SCCM), respectively. For example, when a set flow rate is 50 SCCM (a set flow rate %=50/3100=1.613%), only the controller FCS(A) is operated or actuated, and the input signal 1e=5V×50/100=2.5V is inputted to the controller FCS(A). Similarly, when a set flow rate is 2000 SCCM (a set flow rate %=2000/3000=64.52%), the controller FCS(A) outputs a flow rate of 100 SCCM with the flow rate setting part %=100%, and the control signal 1e=5V×100/100=5V is inputted to the controller FCS(A), while the controller FCS(B) outputs a flow rate of 1900 SCCM, and in response to receiving control signal 1f=5V×1900/3000=3.17V inputted to the controller FCS(B).

Figure 3:
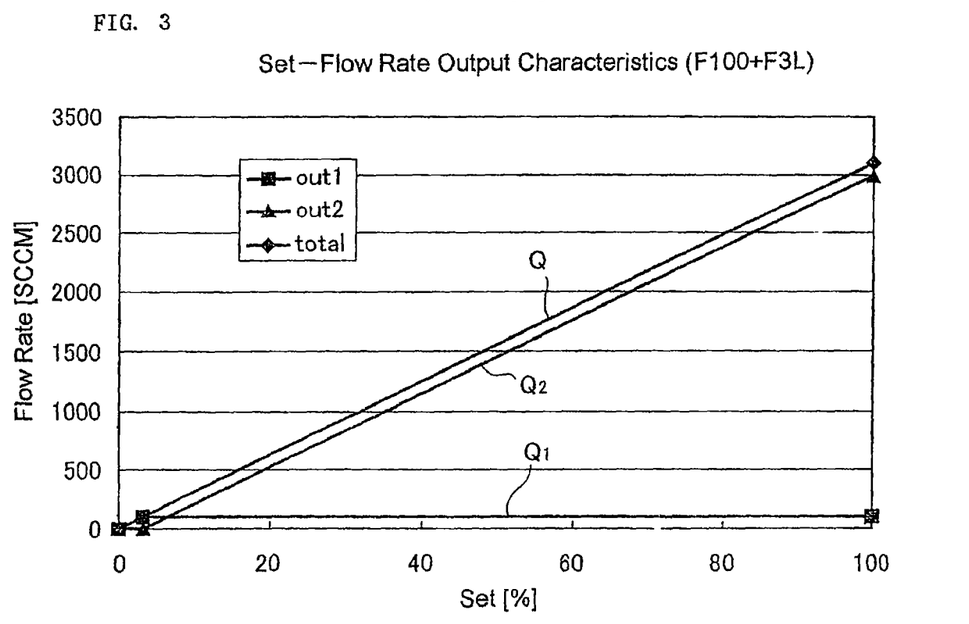
FIG. 3 is a diagram showing the relationship of flow rate setting (%), flow rates SCCM of all the pressure type flow controllers, and supply flow rate Q to the chamber E, for an internal pressure controller of a chamber made in accordance with the embodiment of FIG. 1.

FIG. 3 shows the relationship between allotted control flow rates $Q_1$ and $Q_2$ of pressure type flow controllers FCS(A) and FCS(B), respectively, and the total supply flow rate Q to chamber E using the fluid supply facility A shown in FIG. 1. As shown in FIG. 3, for a total flow rate Q that is Q=100/3·set % only the FCS(A) controller is in operation. This case occurs whenever Q=less than 100 SCCM. On the other hand, for a total flow rate Q that is Q=3000/97·set %+700/97 SCCM both FCS(A) and FCS(B) controllers are in operation, which occurs whenever Q=more than 100 SCCM.

Figure 4:
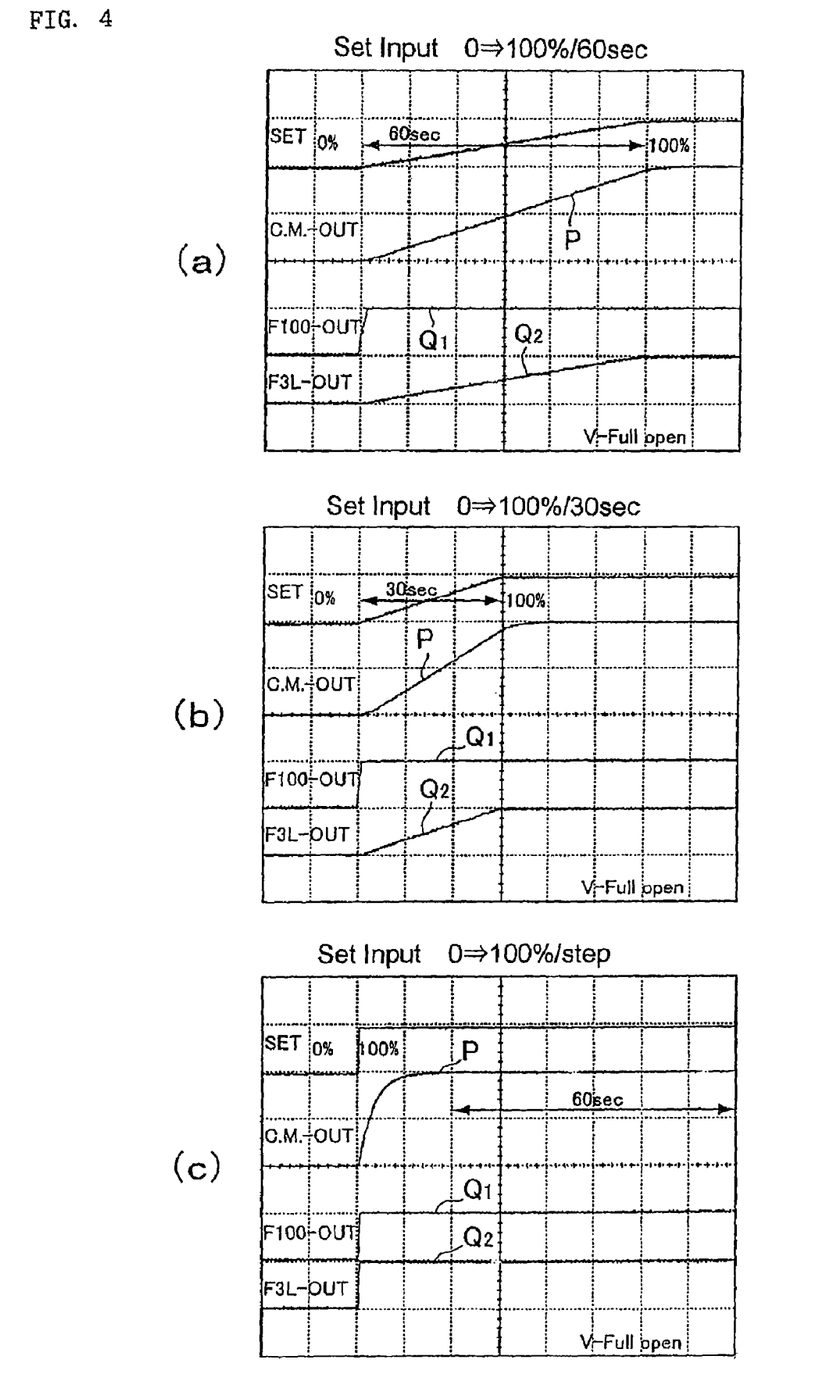
FIG. 4 includes diagrams showing the relationship of a state of a control signal inputted to all of the pressure type flow controllers, flow rate outputs $Q_1$ and $Q_2$ of all of the pressure type flow controllers, and pressure P inside chamber E for an internal pressure controller of a chamber made in accordance with the embodiment of FIG. 1.

FIG. 4 (a) to (c) show experimental data explaining the need for the control signal rising rate setting mechanism 1a' of the input setting part 1a. FIG. 4 (a) to (c) also show the relation of followability between the state of application of flow rate control signals 1e and 1f and pressure P of the chamber E (i.e., corresponding to a control flow rate Q) when total flow rate is increased from 0% (0 SCCM) to 100% (3100 SCCM) by operating both FCS(A) and FCS(B) controllers as required. In accordance with this experiment, the exhaust system of chamber E is set to a state of full operation (i.e., an adjustment valve V is in a full-open state and vacuum pump VP is continuously operated at its full capacity).

Specifically, FIG. 4 (a) graphically shows the state of changes in pressure P of a chamber E in the case where the intensity of a setting signal to the input setting part 1a is made to change from 0% to 100% in approximately 60 seconds. FIG. 4 (b) graphically shows the state of changes in pressure P of a chamber E in the case where the intensity of a setting signal to the input setting part 1a is made to change from 0% to 100% in approximately 30 seconds. Further, FIG. 4 (c) graphically shows the state of changes in pressure P of a chamber E in the case where the intensity of a setting signal to the input setting part 1a is made to change in step-like instantaneous fashion.

From FIG. 4 (a) and FIG. 4 (b), it is demonstrated that a so-called "pressure control" is perfectly achieved in the state wherein pressure P of chamber E continuously increases in a manner nearly proportional to a flow rate setting % (SET).

From FIG. 4 (c), however, it is found that pressure P of chamber E (which depends on a supply flow rate Q to chamber E) is not able to change in step-like fashion in response to step changes made of the flow rate setting % (SET), thus demonstrating that it is impossible for control of pressure P of a chamber E to follow instantaneous or near instantaneous SET step changes for approximately 20 seconds. In other words, while step changes of control signal 1c (or flow rate $Q_1$) and of control signal 1d (or flow rate $Q_2$) may be made instantaneously, the control of pressure P of chamber E cannot follow instantaneously but must lag behind for a period of time during operation of gas supply facility A of FIG. 1.

The Second Illustrative Embodiment

Figure 5:
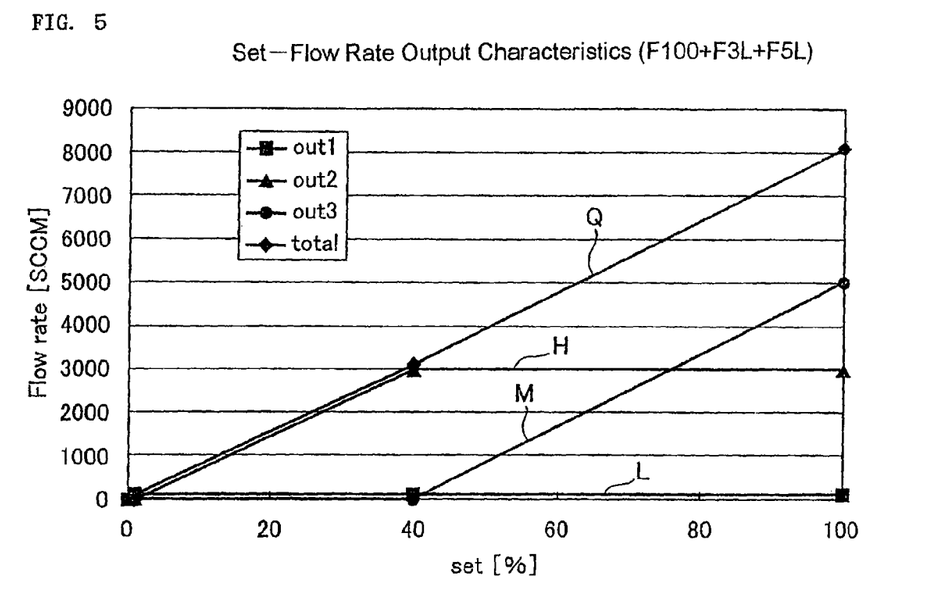
FIG. 5 is a diagram showing the relationship between flow rate setting (%) of an internal pressure controller of a chamber and control flow rate Q with regard to a second embodiment of the present invention wherein 3 pressure type flow controllers are employed in an internal pressure controller of the chamber.

FIG. 5 is a diagram to show a relationship between set flow rate and flow rate output in the second non-limiting embodiment for a fluid supply facility according to the present invention. In accordance with the second embodiment, the fluid supply facility corresponding to the graph shown in FIG. 5 is constructed to include 3 pressure type flow controllers FCS(A), FCS(B) and FCS(C) with rated flow rates of 100 SCCM, 3000 SCCM and 5000 SCCM, respectively, When these three pressure type flow controllers are employed, accurate flow control over the wider flow rate ranges of 5 SCCM to 8100 SCCM is achieved.

From FIG. 5, flow rate characteristics of the pressure type flow controllers FCS(A), FCS(B) and FCS(C), respectively, are shown by curve L for 100 SCCM, curve H for 3000 SCCM, and by curve M for 5000 SCCM. Q is a supply flow rate to the chamber E. In other words, when the supply flow rate Q is less than 100 to 3100 SCCM, the flow rate Q is determined by the formula:

$$Q=(3100-100)/(40-1)\cdot(\text{SET \%}-1)+100=(3000/39)\cdot\text{SET \%}+(900/39).$$

When the supply flow rate Q is 3100 to 8100 SCCM, the flow rate Q is determined by the formula:

$$Q=(5000/60) \cdot \text{SET \%} - (14000/60).$$

Figure 6:
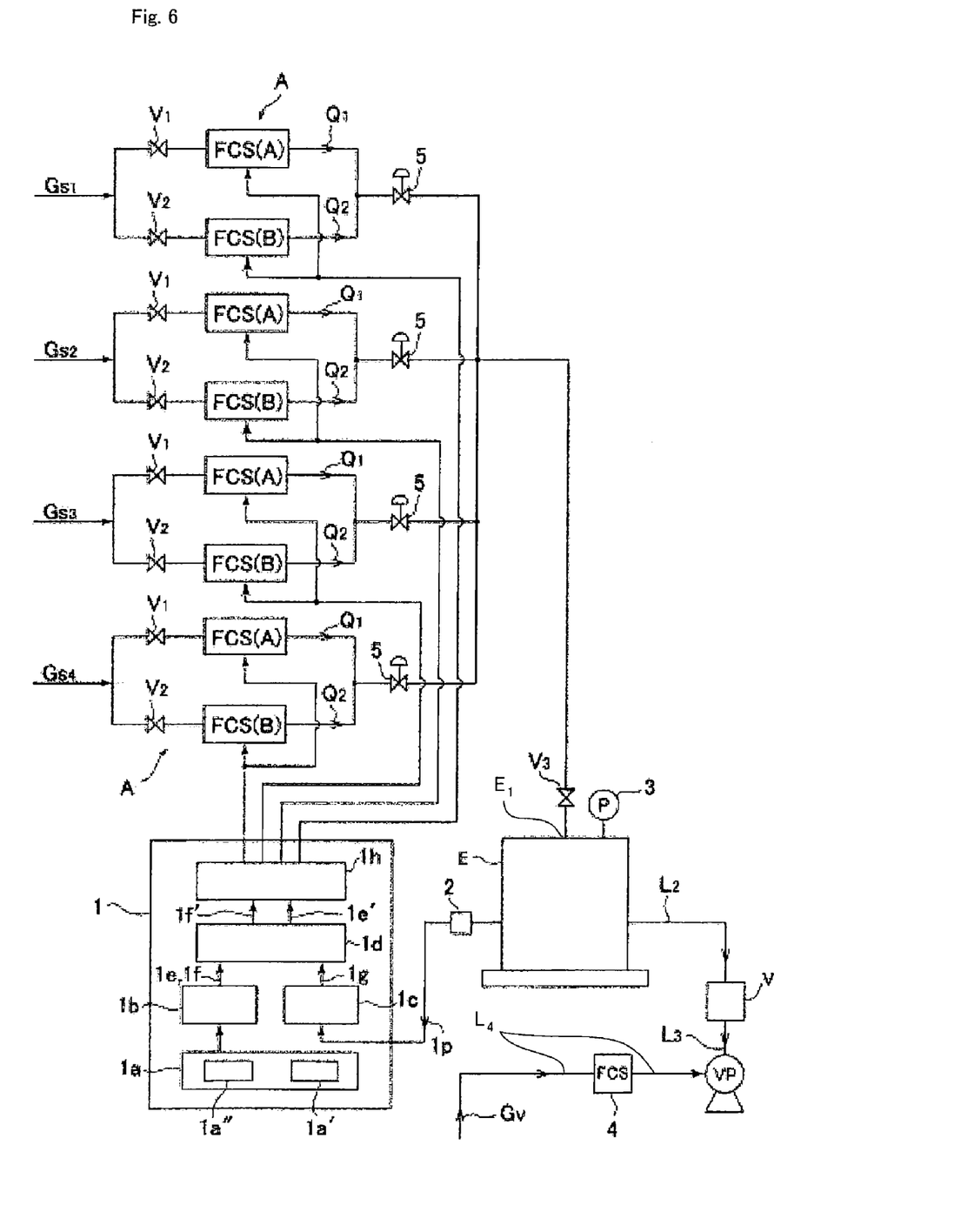
FIG. 6 is a whole system diagram illustrating another embodiment of an internal pressure controller of a chamber for which a plurality of gas supply facilities is provided.

For both the first embodiment of FIG. 1 and the second embodiment corresponding to FIG. 5, it is assumed that the supply gas Gs is of one kind of gas. However, when more than 2 types of supply gas $Gs_1$, $Gs_2$ . . . , are employed, the same number of gas supply facilities A, wherein each gas supply facility is constructed in accordance with the first embodiment and second embodiment of the invention, as the number of different gas types can be provided in parallel as shown in FIG. 6. In this embodiment, a switching valve 5 is provided for each one of the plurality of gas supply facilities A. Each switching valve may be independently switched for operation using control signals from switching operation part 1h, thus allowing a plurality of different supply gases to be supplied in any desired combination to the chamber E. The switching operation part 1h is a controller that generates control signals and determines which gas supply facilities (A), (i.e., the gas supply facility providing gas $Gs_1$, the gas supply facility providing gas $Gs_2$, the gas supply facility providing gas $Gs_3$, the gas supply facility providing gas $Gs_4$), are in operation as well as the degree of operating capacity for which each is operated.

In accordance with the first embodiment and second embodiment of the present invention, the supply gas Gs, or $Gs_1$, $Gs_2$, is/are of a non-mixed nature. However, it is within the scope of the present invention for the supply gas Gs, or supply gases $Gs_1$, $Gs_2$, etc., to be a mixed gas or mixed gases, for example, the mixture of Ar and $CF_4$ (with an arbitrarily selected ratio).

Next, operation of the internal pressure controller of a chamber, according to the present invention, will be explained as follows. Referring to FIG. 1, a non-limiting illustrative example may have chamber E including an inside capacity of 11 liters, and the evacuation system of chamber E comprises an adjustment valve V, a vacuum pump VP, a pipe $L_2$ and a pipe $L_3$. The vacuum pump VP, for example, may have an exhaust volume of 300 liters/min.

The internal pressure controller of the present invention is made so that pressure P inside chamber E is controlled to a specified process pressure by finely adjusting the flow rate Q of the gas supplied into the chamber E continuously using a vacuum pump VP having a certain exhaust capacity. In this way a specified process pressure is controlled to remain at approximately $10^{-2}$ to $10^2$ Torr.

Figure 7:
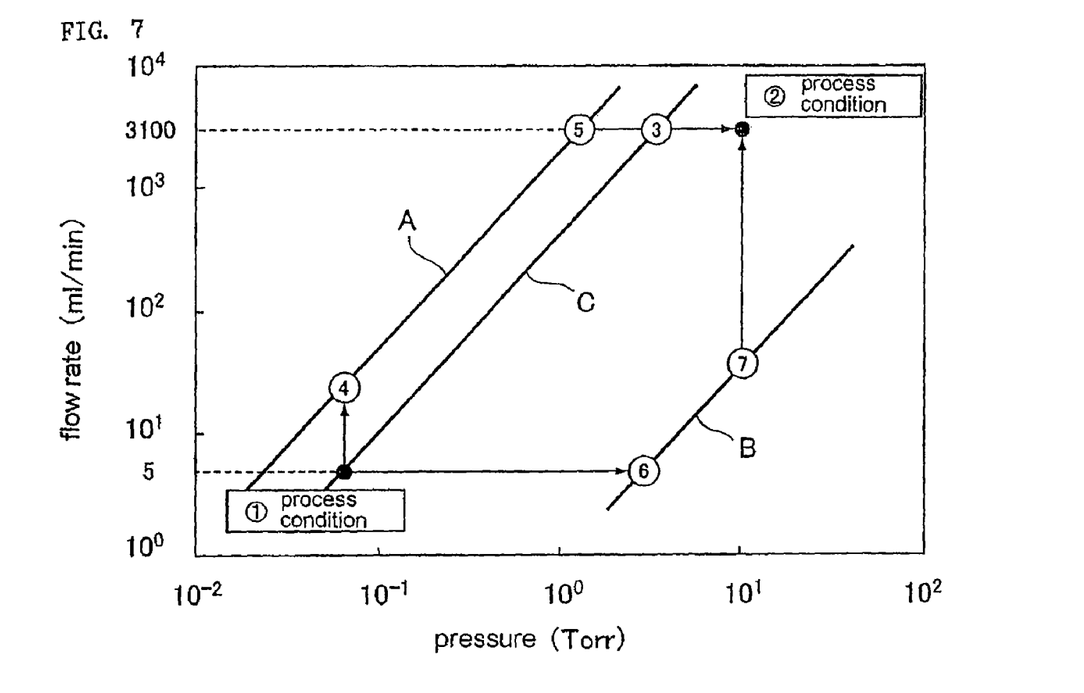
FIG. 7 is a diagram showing the relationship between controllable internal pressure P of the chamber and supply flow rate Q for an internal pressure controller of a chamber made in accordance with the embodiment in FIG. 1.

With reference to FIG. 1 again, firstly an adjustment valve V is fully opened to keep resistance off the flow passage of the evacuation system to a minimum, and the vacuum pump VP is operated to evacuate chamber E to a degree of vacuum compatible with the evacuation capacity of the vacuum pump VP. Next, the flow rate Q of the supply gas is determined for achieving a pressure P by referring to the pressure-flow rate characteristic curve of the chamber E and the evacuation system, which has been determined beforehand as shown in FIG. 7. The relationship between internal pressure P and the supply flow rate has been previously data-processed and conveniently stored in an accessible memory device.

Subsequently, the gas supply facility A is operated to supply the flow quantity Q of a gas Gs required to secure the set pressure P for the chamber E. The range of internal pressure adjustment for the chamber E using the supply of gas Gs can be changed by adjusting the degree of opening of the adjustment valve V under conditions such that the exhaust capacity of the vacuum pump VP is kept constant. As described later, in the case where the internal pressure of the chamber is to be raised (i.e., corresponding to a low degree of vacuum), the opening of the adjustment valve V is adjusted to make it small in order to increase resistance of the pipe passage of the evacuation system. On the other hand, when the internal pressure of the chamber E is to be lowered (i.e., corresponding to a high degree of vacuum), the adjustment valve V is adjusted so as to be fully opened.

FIG. 7 is a diagram graphically showing the relationship between the supply flow rate Q to the chamber E and the internal pressure P of the chamber E in the embodiment of the invention shown in FIG. 1. FIG. 7 shows the pressure-flow rate characteristics at the time when the vacuum pump VP is operated continuously at its rating, and the adjustment valve V is placed in the state of maximum or minimum opening. Specifically, curve A in FIG. 7 demonstrates the pressure-flow rate characteristics for the embodiment of FIG. 1 operated at the time when the adjustment valve V is opened to its maximum. Curve B in FIG. 7 shows the pressure-flow rate characteristics for the same embodiment of FIG. 1, but at the time when the adjustment valve V is opened to its minimum. Curve C demonstrates the pressure-flow rate characteristics for an arbitrary conductance of the evacuation system, which may be adjusted to realize the arbitrary process condition (1) and the process condition (2) inside of chamber E.

As apparent from FIG. 7, using the chamber E and the connected evacuation system as shown in FIG. 1, the gas supply flow rate Q to chamber E may be controlled at 5 to 3100 SCCM, and by appropriately adjusting the conductance of the evacuation system, it is possible to adjust pressure inside chamber E over the flow rate/pressure range bordered with numbers (1)-(4)-(5)-(3)-(2)-(7)-(6) shown in FIG. 7, which corresponds to pressure changes to over $10^1$ Torr to $0.8 \times 10^{-1}$ Torr.

Needless to say, by changing the constitution of the evacuation system (i.e., the conductance of the evacuation system, the evacuation capacity of the vacuum pump VP, and the like) and by changing the flow rate control range of the fluid supply facility A, the adjustment range of the flow rate/pressure curve shown in FIG. 7 can be changed. Accordingly, it becomes possible that the flow rate range of the fluid supply facility A, and the evacuation capacity of the vacuum pump VP, can be appropriately chosen depending on conditions required for the process chamber E. By supplying a gas Gv to the vacuum pump VP (or an exhaust pipe $L_3$) through a pressure type flow controller 4, as shown in FIG. 1, it also becomes possible to maintain pressure inside the process chamber E at a specified pressure value by adjusting the exhaust capability of the vacuum pump VP. Furthermore, using the embodiment shown in FIG. 1, when pressure inside the chamber E is maintained around $10^{-2}$ to $10^2$ Torr, it is possible to further control the pressure inside of chamber E to approximately $10^{-2}$ to $10^{-6}$ Torr by changing the flow rate control range of the manometer and the fluid supply facility A. In other words, it is possible to control pressure inside of chamber E down to approximately $10^{-2}$ to $10^{-6}$ Torr by operating the manometer and the fluid supply facility A at their lower flow rate ranges.

It is noted that, with respect to semiconductor manufacturing facilities, the pressure control range is normally set at $10^{-2}$ to $10^1$ Torr, and the flow rate control range Q is normally set at 3 SCCM to 5000 SCCM. Inactive gases, such as He, Ar and the like or gases mixed therewith, are used as gases Gv supplied into the vacuum pump VP for pressure adjustments.

FEASIBILITY OF INDUSTRIAL USE

The present invention is adaptable for use for providing a supply flow rate control of a gas to a process chamber, or for controlling pressure inside a process chamber and the like, within semiconductor manufacturing facilities.

The invention claimed is:

1. An internal pressure controller associated with a chamber, comprising:
    (a) a supply gas input part;
    (b) a supply gas output part connected to receive supply gas from the supply gas input part;
    (c) a gas flow rate control part operably connected between the gas input part and gas output part,
    wherein the chamber is connected to receive supply gas from the supply gas output part; and
    (d) a means to transmit pressure data of the chamber to the gas flow rate control part, wherein the gas flow rate control part includes
        i. a plurality of first pressure type flow rate controllers connected in parallel; and
        ii. a first controller operable to control the operation of the plurality of first pressure type flow controllers, wherein each of the first pressure type flow controllers comprises: (1) an orifice; (2) a pressure detector on an upstream side of the orifice; (3) a control valve provided on the upstream side of the pressure detector; and (4) a computation control part that outputs a difference Qy with a set flow rate Qs as a driving signal to the control valve by computing a gas flow rate Qc passing through the orifice with pressure $P_1$ detected by the pressure detector using formula $Qc=KP_1$, where K is a constant, thus operating a respective one of the first pressure type flow controllers under a state wherein pressure $P_1$ is maintained more than approximately 2 times of pressure $P_2$ on the downstream side of the orifice, wherein one of the first pressure type flow controllers is operated as a second controller controlling the gas flow rate range up to 10% of the maximum flow rate supplied to the chamber while the remaining first pressure type flow controllers are operated as third controllers controlling the rest of the gas flow rate range of the maximum flow rate supplied to the chamber, wherein the second controller is initially operated to control the gas flow rate range up to 10% of the maximum flow rate, and when the gas flow rate reaches 10% of the maximum flow rate the third controllers are switched into operation, and wherein pressure data is inputted to the first controller to adjust a control signal to each of the first pressure type flow controller so as to control gas flow rate to the supply gas output part,
    wherein the chamber is connected to an evacuation system, and the evacuation system is connected to an additional gas supply pipe for adjusting an exhaust capacity of the evacuation system by supplying an additional gas to the evacuation system, during the process of controlling the gas flow rate by the first pressure type flow controllers, wherein the additional gas supply pipe comprises a second pressure type flow controller which adjusts a flow rate of the additional gas and controls the internal pressure of the chamber by reducing an exhaust capability of the evacuation system with the supply of the additional gas.

2. An internal pressure controller of a chamber as claimed in claim 1, wherein the first controller comprises:
    an input setting part to set gas flow rate supplied to the chamber;
    a first signal conversion part that operates to convert an input value to the input setting part into a flow rate control signal;
    a second signal conversion part that operates to convert detected pressure inside the chamber to a flow rate control signal; and
    a comparison correction part operably connected to receive flow rate control signals from both the first signal conversion part and the second signal conversion part so the first controller controls a supply volume of supply gas into the chamber by transmitting corrected control signals to all of the first pressure type flow controllers from the comparison correction part.

3. An internal pressure controller of a chamber as claimed in claim 2, wherein the input setting part comprises a rising rate setting mechanism for initiating control signals transmitted to pressure type flow controllers allotted for all the flow rate ranges, and the pressure type flow controllers supply the set flow rate of gas after a specified lapse of time following transmission of the control signals initiated by the rising rate setting mechanism.

4. An internal pressure controller of a chamber as claimed in claim 1, wherein the plurality of first pressure type flow controllers include two pressure type flow controllers connected in parallel, and one of the two first pressure type flow controllers operates to control a gas flow rate range of 0.1 to 10% of a maximum flow rate supplied to the chamber, while the other one of the two first pressure type flow controllers operates to control a gas flow rate range of 10 to 100% of the maximum flow rate supplied to the chamber.

5. An internal pressure controller of a chamber as claimed in claim 4, wherein the plurality of first pressure type flow controllers are controlled to operate starting with the first pressure type flow controller for the smaller gas flow range in turn due to control signals transmitted from the signal conversion part of the controller.

6. An internal pressure controller of a chamber as claimed in claim 4, wherein a plurality of supply gases is supplied to the chamber by installing a plurality of supply gas facilities connected in parallel, wherein the plurality of supply gas facilities include at least 4 units, wherein a first unit of the supply gas facilities includes the two first pressure type flow controllers connected in parallel, and each of the remaining units of the supply gas facilities includes two third pressure type flow controllers, wherein one of the two third pressure type flow controllers operates to control a gas flow rate range of 0.1 to 10% of a maximum flow rate supplied to the chamber, while the other one of the two third pressure type flow controllers operates to control a gas flow rate range of 10 to 100% of the maximum flow rate supplied to the chamber.

7. An internal pressure controller of a chamber as claimed in claim 1, wherein a plurality of supply gases is supplied to the chamber by installing a plurality of pressure type flow controllers connected in parallel, wherein the plurality of pressure type flow controllers includes at least 4 units.

8. An internal pressure subject-to-control type chamber system comprising:
    (a) a chamber exhausted by a vacuum pump through an exhaust pipe;
    (b) a gas supply means for supplying a desired gas to the chamber while controlling flow rate of the gas, wherein the gas supply means comprises
        i. a plurality of first pressure type flow controllers connected in parallel; and ii. a first controller operable to control the operation of the plurality of first pressure type flow controllers, wherein the first controller comprises: (1) an orifice; (2) a pressure detector on an upstream side of the orifice; (3) a control valve provided on the upstream side of the pressure detector; and (4) a computation control part that outputs a difference Qy with a set flow rate Qs as a driving signal to the control valve by computing a gas flow rate Qc passing through the orifice with pressure $P_1$ detected by the pressure detector using formula $Qc=KP_1$, where K is a constant, thus operating each pressure type flow controller under a state wherein pressure $P_1$ is maintained more than 2 times of pressure $P_2$ on the downstream side of the orifice, wherein one of the first pressure type flow controllers is operated as a second controller controlling the gas flow rate range up to 10% of the maximum flow rate supplied to the chamber while the remaining first pressure type flow controllers are operated as third controllers controlling the rest of the gas flow rate range of the maximum flow rate supplied to the chamber, wherein the second controller is initially operated to control the gas flow rate range up to 10% of the maximum flow rate, and when the gas flow rate reaches 10% of the maximum flow rate the third controllers are switched into operation, and wherein the chamber is further provided with a pressure detector, and a detected value of the pressure detector is inputted to the first controller to adjust a control signal transmitted to the pressure type flow controllers and to control the supply rate of gas to the chamber so internal pressure of the chamber is controlled with high accuracy over the wide range; and (c) an additional gas supply pipe connected to the vacuum pump for adjusting an exhaust capacity of the vacuum pump by supplying an additional gas to at least one of the vacuum pump and the exhaust pipe, during the process of controlling the gas flow rate by the first pressure type flow controllers, wherein the additional gas supply pipe comprises a second pressure type flow controller which adjusts a flow rate of the additional gas and controls the internal pressure of the chamber by reducing an exhaust capability of the vacuum pump with the supply of the additional gas.

* * * * *